Jan. 16, 1934. A. McL. NICOLSON Re. 19,051

ART OF SOUND REPRODUCTION

Original Filed June 20, 1927 3 Sheets-Sheet 1

INVENTOR.
Alexander McLean Nicolson
BY
Val R. Sullivan
ATTORNEY

Jan. 16, 1934. A. McL. NICOLSON Re. 19,051

ART OF SOUND REPRODUCTION

Original Filed June 20, 1927 3 Sheets-Sheet 2

INVENTOR.
Alexander McLean Nicolson
BY
Orl R. Goshaw
ATTORNEY

Jan. 16, 1934. A. McL. NICOLSON Re. 19,051

ART OF SOUND REPRODUCTION

Original Filed June 20, 1927 3 Sheets-Sheet 3

INVENTOR.
Alexander McLean Nicolson
BY Irl R. Loshaw
ATTORNEY

Reissued Jan. 16, 1934

Re. 19,051

UNITED STATES PATENT OFFICE 19,051

ART OF SOUND REPRODUCTION

Alexander McLean Nicolson, New York, N. Y., assignor to Communication Patents, Inc., New York, N. Y., a corporation of Delaware Original No. 1,851,208, dated March 29, 1932, Serial No. 199,895, June 20, 1927. Application for reissue September 9, 1932. Serial No. 632,386

19 Claims. (Cl. 250—14)

This invention relates to electrical and acoustic apparatus and more particularly to apparatus adapted to reproduce at any desired volume sounds corresponding to electrical oscillations, which electrical oscillations may be currents derived from received wireless or radio signals, speech currents from a telephone line, audio frequency currents or radio frequency oscillations modulated at audio frequencies as produced by electric phonograph apparatus or the like.

One of the difficulties of radio reception in the past has been that of providing comfortable audition of radio signals for one who desires to hear them without disturbing others in the vicinity who may not wish to listen: for example, one may desire to listen to incoming radio signals at a late hour when persons are sleeping in adjoining rooms, or in the case of sickness where quiet is essential. Under such circumstances in the past, it has been necessary for the person listening to such signals to utilize the socalled "head telephones", if quality of reproduction was desired. As is well known, head telephones are uncomfortable if worn for any considerable period: and it is usually the case that if one member of a household desires quiet it becomes necessary to dispense with radio reception during such period. It has been attempted by listeners under such circumstances to obtain loud speaker reproduction by the use of a volume control to decrease the intensity of sound radiated to such value that it might be comfortably heard by the listener but without disturbing others. However, as is well known, it is not possible under such circumstances to obtain satisfactory quality of reproduction of speech or music, for the reason that when the volume is turned down to such a point that it is inaudible to those in the vicinity who do not wish to listen, it is usually inaudible to the person desiring to listen, or if not inaudible, the low frequency response is largely lost and the quality of the sound is distorted, the reason apparently being that the low frequency sound waves require a large amplitude of motion of the loud speaker diaphragm in order to be propagated any distance from the loud speaker, and such amplitudes are not obtainable when the volume is decreased to a point such that the high frequencies are audible for only a short distance. It results, therefore, that in order to hear music or speech of good quality, the listener must place his ear or ears in extremely close proximity to the speaker, and this close proximity is not obtainable comfortably with the present types of speakers.

It is an object of the invention to provide such apparatus which will allow the approach of the ear or ears in intimate and comfortable proximity thereto, and including, if desired, means whereby the operator or listener may reduce the volume to a point such that the sounds produced are clearly and comfortably audible to him with his ear or ears in proximity to the sound reproducing apparatus, but of insufficient intensity to be heard at any substantial distance therefrom.

It is still a further object of my invention to provide radio receiving and sound radiating apparatus which may be enclosed within a soft resilient comfortable covering having minimum sound absorbing properties, whereby the apparatus may be used as a pillow, cushion or the like, to permit of the comfortable observation by the listener of the desired sounds clearly audible to him but inaudible to others in proximity to him, without the necessity of wearing head telephones, which covering may include within itself all apparatus necessary for the reception, selection, amplification, detection and reproduction of radio or like signals at the desired volume, or any desired part of such apparatus.

It is a further object of this invention to provide apparatus of the class described and which may be enclosed within an article of furniture to render it inconspicuous to permit of such apparatus being disposed in rooms and other places where such apparatus in its now available form might be out of place. Still other objects and advantages of my invention will be apparent from the specification.

The features of novelty which I believe to be characteristic of my invention are set forth with particularity in the appended claims. My invention itself, however, both as to its fundamental principles and as to its practical application will best be understood by reference to the specification and accompanying drawings, in which:

Figure 5A:
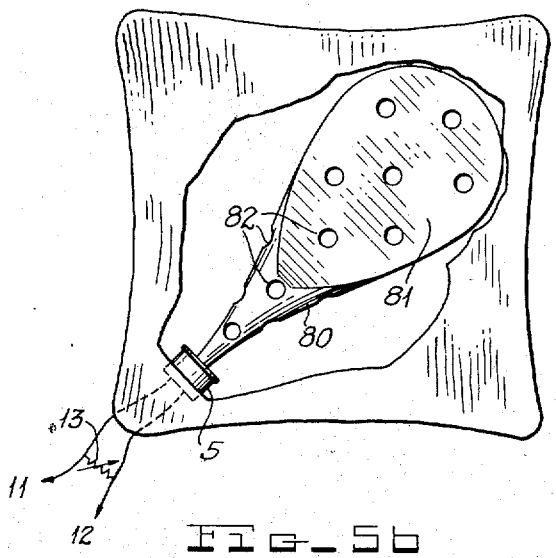
Figure 5B:
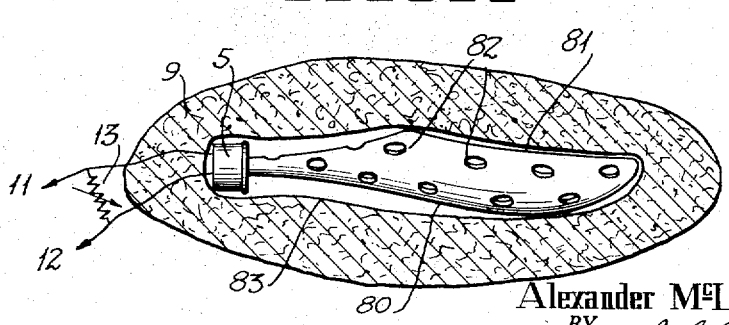

Figure 5*a* is a top plan view partly broken away of an arrangement in which the framework is dispensed with, and Figure 5*b* is an elevation view partly in section thereof.

Figure 6:
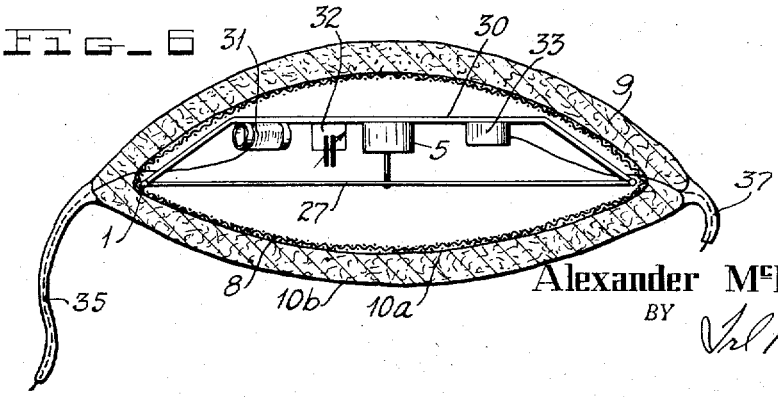

Figure 6 illustrates a similar arrangement but enclosing within the covering a simple form of radio receiving and detecting apparatus.

Figure 4:
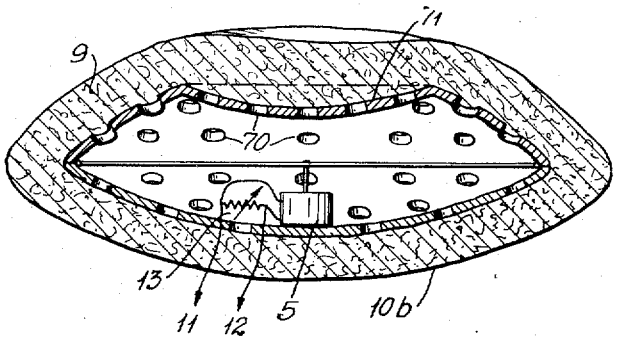
Figure 4 illustrates a slightly different form of supporting frame for the resilient and yielding envelope.
Figure 7A:
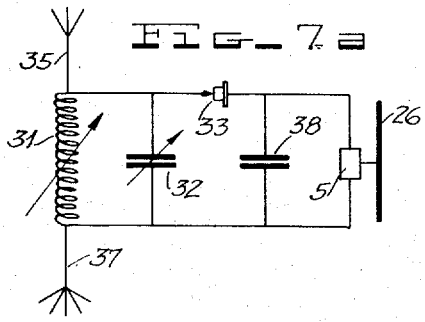
Figure 7B:
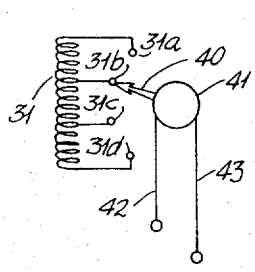
Figure 7C:
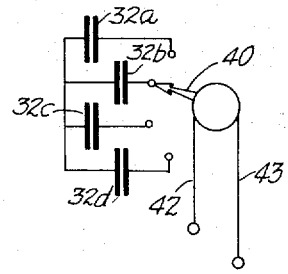

Figures 7*a*, 7*b*, and 7*c* are respectively circuit diagrams of the apparatus shown in Figure 4, and details of the control mechanism.

Figure 8:
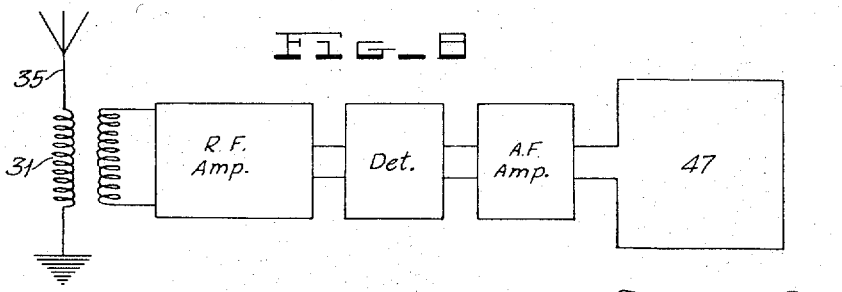
Figure 8:
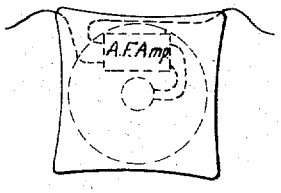

Figure 8 is a diagrammatic view of a system in accordance with my invention in which the sound radiating apparatus is enclosed within the covering and adapted to receive by inductive or capacitive coupling audio frequency currents corresponding to received radio signals and the like.

Figure 9:
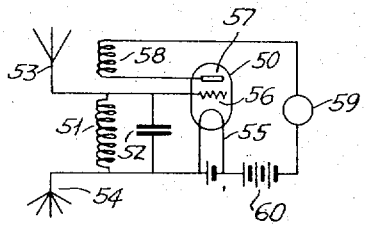
Figure 9:
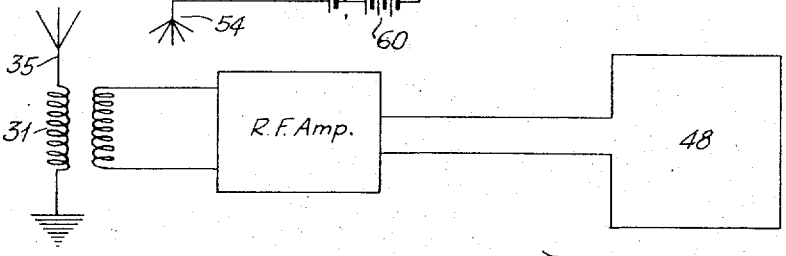
Figure 9:
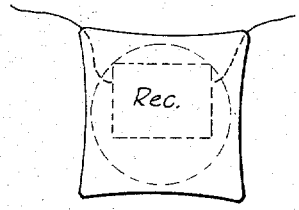

Figure 9 is a similar view of a slightly modified form of apparatus.

Figure 10:
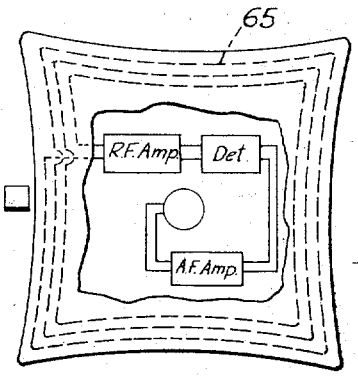

Figure 10 is a diagrammatic view of a still further modified arrangement which may be used in accordance with my invention.

In accordance with my invention, I provide sound reproducing and radiating apparatus such as a cone, horn, or sounding board, or a plurality of such devices, adapted to be driven by any suitable mechanism, such for example, as an electro-magnetic or electro-static receiver or a piezo-electric device such as a crystal of Rochelle salt, and I enclose this sound radiating apparatus within a covering adapted to support on its outer surface a layer of resilient and flexible material. The layer of resilient and flexible material is preferably made up of a substance or substances having minimum acoustic damping properties, and supported in a suitable manner by an open grille, mesh or similar structure, so as to interfere as little as possible with the radiation of sound, while affording sufficient rigidity to protect the apparatus enclosed within it.

I also provide a volume control which may be in the form of a variable resistance shunted across the reproducing apparatus whereby the listener may control the volume of sound reproduced, at will.

In accordance with one aspect of my invention, a connection may be provided in the conventional manner to enable the sound reproducing apparatus to be plugged into any suitable radio receiver, electric phonograph, telephone line or the like. In accordance with another aspect of my invention, such connections may be dispensed with if desired, and a pick-up device may be comprised within or attached to the covering. Under certain conditions, this pick-up device may be in the form of a closed or open circuit adapted to be coupled inductively or capacitively with similar circuits carrying currents of acoustic frequency, and supplied by the output circuit of the radio receiving apparatus, electric phonograph apparatus, telephone line or the like.

In accordance with still another modification of my invention, the pick-up device instead of operating at audio frequency, may operate at radio frequency or carrier frequency, to pick up electrical oscillations of such frequencies radiated either directly from a transmitter or secondarily from a receiver adapted to receive such oscillations and to retransmit or reradiate them at the same or different frequencies.

The pick-up device in accordance with the simplest form of my invention adapted to operate at other than audio frequencies, may comprise a simple tuning system, a crystal or other detector, and sound reproducing apparatus as previously described.

In another form of my invention, such pick-up device may comprise a radio frequency amplifying system, either tuned or untuned, and the desired detecting and audio frequency amplifying apparatus as well as the sound radiating apparatus.

Figure 1:
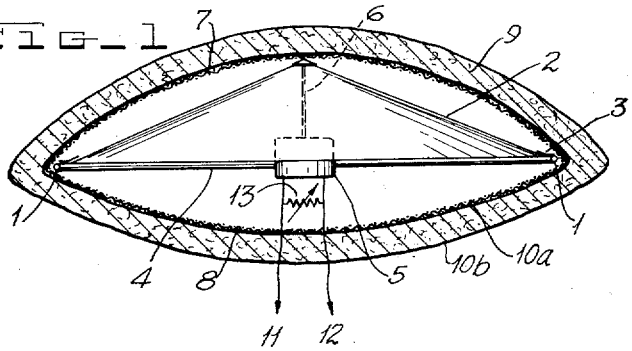
Figures 1, 2 and 3 are diagrammatic views in partial section of various forms of sound reproducing apparatus enclosed within a soft resilient covering in accordance with my invention, and including sound reproducing apparatus and means for controlling the volume of sound reproduced.

Referring now more particularly to Fig. 1, I have shown an arrangement of sound reproducing apparatus in the form of a pillow: in this arrangement, 1 represents a main frame ring of metal, metal tubing, wood, or the like, having the basic shape of the pillow: if a round pillow is desired, the frame or ring 1 may be circular: if a rectangular pillow is desired, the ring 1 may be given the appropriate shape. Mounted within this frame or ring 1 is provided, in this instance, a conical diaphragm 2 of suitable material, such as paper, reinforced fibre, or the like, secured to the ring 1 at its periphery by means of an annular hinge 3 of flexible material, such as cloth, paper, leather, or the like. Suitable brackets, braces or cross arms 4, may extend inwardly from the ring 1 to some interior point such as the center for the purpose of supporting a suitable driving mechanism 5 for operating the diaphragm by means of a connection 6. The driving mechanism 5 may be an electro-magnet of the usual type, or it may comprise an electro-static driving mechanism or a piezo-electro crystal device of the types known in the art.

For the purpose of protecting the diaphragm and the mechanism contained within the pillow, and also for the purpose of providing a firm foundation upon which may be built a yielding and resilient surface, I provide a pair of cover members 7 and 8 adapted to be secured in position on opposite sides of the ring 1. The cover members 7 and 8 are preferably constructed in a manner to provide the necessary or desired mechanical rigidity while at the same time interfering as little as possible with the radiation of the sound from diaphragm 2. For this purpose, these members may be built up of wire mesh of sufficient strength, perforated metal plates, wicker work, or the like, affording relatively large mechanical strength while at the same time presenting minimum impedance to the passage of sound waves therethrough. In order to provide for a resilient and yielding surface, the members 7 and 8 may be covered with a layer of cloth 10*a* such as cheese cloth, muslin, or the like, affording a bed upon which may be built a layer of resilient and sound conducting material 9.

In order to obtain the best results, the layer of material 9 should be sufficiently thick to provide a yielding and resilient surface against which the ears or other members of the body of the listener may be reposed in comfort, while at the same time, this layer of material should not introduce any considerable damping upon the sound waves, at any acoustic frequency. Various materials may be used for this purpose, but I have found that the most satisfactory material is evergreen foliage, such as balsam, hemlock or arbor vitæ, pine needles, and the like. The theoretical explanation of the superior results obtained from this material in comparison with other materials, is not entirely clear, but is probably due to the fact that evergreen foliage in quantity between spaced surfaces of cloth or similar material, provides a relatively resilient and yielding structure, in which the free spaces of air are relatively large and in which sound may travel freely, almost as in free air, whereas in the case of materials in which the air spaces are relatively smaller and are more completely filled with material, free movement of air pressure therethrough is thereby hindered or prevented. At any rate, whatever the theoretical explanation may be, I wish to note the fact that best results are obtained with the materials specified.

After a layer of the desired depth of such material has been built up, for example 1'' or 2'' in thickness, an outer covering 10*b* may be attached, and finally if desired, an ornamental or decorative cover may be applied over all, the ornamentation or decoration being chosen to suit the taste and to harmonize with the setting in which the apparatus is to be used, without interference with the free passage of sound.

Figure 1A:
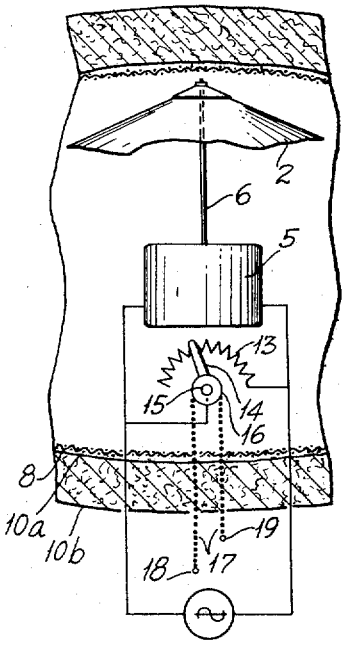
Figure 1*a* is a detail diagrammatic view of a suitable volume control.

For the purpose of controlling the operation of the device, leads 11 and 12, through which currents of audio frequency are supplied to cause operation of the device, may be provided with a suitable by-pass 13, herein diagrammatically shown as resistance, but it will be understood that an inductance and capacity or any combination of those, may be provided. A suitable control for the by-pass 13 is extended to the exterior of the pillow, for example in the manner shown in Figure 1*a*, wherein there is provided a resistance suitably mounted in the form of an arc and adapted to be traversed by a contact arm 14 mounted upon a suitable shaft 15, in turn carrying a disc 16, to which cords or chains 17 are attached. Said cords or chains may pass through suitable openings in the members 7 and 8 and the resilient covering therefor and may terminate in knobs, tassels, or the like, such as 18 and 19. In the operation of the device, the leads 11 and 12 are suitably connected to a source of audio frequency currents such as the output of a radio receiver, a telephone line, an electric phonograph, or the like, which as will be readily understood, causes vibration of the diaphragm 2, thereby propagating sound waves through the resilient and yielding cover into the open air. If a relatively large volume of sound is desired, as may be the case when several people wish to listen, impedance of the by-pass 13 will be made a maximum by operation of the controls: if, on the other hand, one desires to listen without disturbing others, the impedance of the by-pass may be adjusted to such value that the intensity of the sound is diminished to the point desired: and it may be decreased to such a point that the operator may place his ear or ears in intimate and comfortable proximity to the diaphragm 2 simply by reclining his head against the pillow in the ordinary manner, and under such conditions the quality of sound radiated to the ear of the listener will be substantially the same as that radiated to the ear of the listener in the usual manner.

Figure 2:
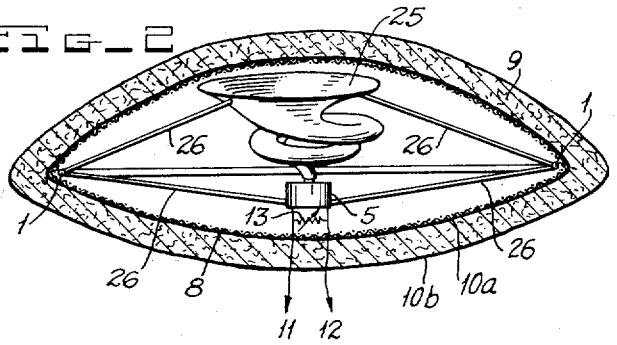

Referring now more particularly to Figure 2, I have shown a horn type of reproducer 25 in place of the cone 2. By coiling the horn upon itself, it is possible to obtain a horn of relatively great length and wide frequency response, with consequent improvement in quality, as is known in the art: in this instance, braces 26 may maintain the horn and operating mechanism in the desired position. As in the arrangement shown in Figure 1, a pair of supporting members 7 and 8 are provided over which is formed a layer of resilient material and the outside coverings, as already described. In addition, a suitable volume control may be provided having its controls extending outwardly through the outer covering as is also the case for leads 11 and 12.

Figure 3:
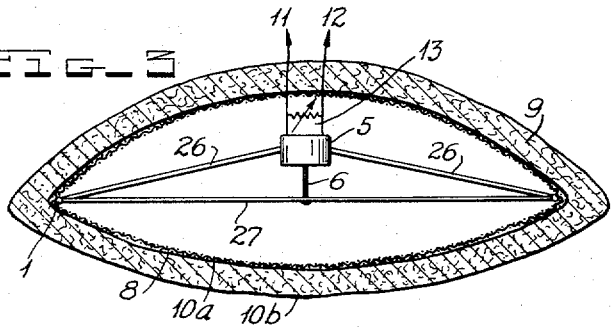

Referring now more particularly to Figure 3, I have shown a similar arrangement except that in this instance the sound radiating element comprises a relatively large plain diphragm 27, which may be a true diaphragm operating as such and constructed of any desired material such as metal, balsa wood, or the like, or may be sufficiently thick and so arranged as to constitute a sounding board.

Referring now to Figure 4, I have shown an arrangement in which, instead of a framework of wire mesh, or the like, I have utilized a pressed or formed member for example, of fibre, composition or the like, made in sections 7 and 8, as before, but provided in this instance with a depression on one side 71 adapted to receive the head of the listener and also provided with a plurality of perforations 70 to permit free transmissions of sound waves therethrough.

While I have shown a large diaphragm as the sound radiator in this figure, it will be understood that other radiators such as those previously referred to may be used in this arrangement if desired.

Under certain conditions, it may be desired to dispense with the supporting envelope, and such an arrangement is shown in Figures 5*a* and 5*b*. In this instance, I provide a horn 80, attached to the speaker unit, which horn may be mutilated to provide a dished portion 81 which may be so constructed as to act as a sounding board, and also as a support for the flexible envelope. The horn 80 may be provided with a plurality of holes or openings 82 of any desired shape and disposition for the purpose of modifying the quality of the sounds reproduced, and of allowing free distribution thereof to the atmosphere. For the purpose of preventing the filling of the envelope from clogging the horn, the horn may be enclosed in a covering 83 of relatively thin and porous cloth such as cheese cloth, muslin or the like. A volume control will preferably be provided as hereinbefore described.

Referring now more particularly to Figure 6, I have shown a modified form of apparatus in which the electrical circuit included therein are complete in themselves and require no connection to outside circuits: In this instance, there may be provided in addition to the sound reproducing mechanism, a bracket or panel 30 supported from ring 1 which may carry the usual elements of a simple radio receiving set, such for example as inductance 31, capacity 32 and a crystal or other detector 33 which may be connected in the circuit shown in Figure 7*a*: Antenna and counterpoise or ground conductors may be attached to the pilow in the form of ribbons, streamers and the like, or a suitable loop antenna may be formed within the covering or otherwise attached thereto. In Figures 7*a*, 7*b*, and 7*c*, 35 represents an antenna connected at one end of the coil 31; 37, a counterpoise connected at the other end of said coil; 32, a condenser in shunt therewith; 33, a suitable detector such as a crystal; 38, a by-pass condenser, utilized if desired; and 5 and 27 respectively represent the driving mechanism and sounding board as shown in Figures 3 and 6. It will be understood that the arrangements shown in Figures 1 and 2, 4, 7*a*, and 7*b* may be utilized, or other suitable sound reproducing mechanism may be substituted for the arrangements shown.

For the purpose of providing for selectivity, coil 31 may be provided with a plurality of taps 31*a*, 31*b*, 31*c*, and 31*d*, arranged as desired, and adapted to be connected selectively in circuit by a suitable contact 40 secured to disc 41, and operated by means of pull chains 42 and 43. It will be understood that snap switches of any suitable type may be substituted, if desired, for the arrangement shown, or a continuously variable inductance may be provided such as a variometer. Similarly, the variation of the capacity may be obtained by providing a plurality of fixed condensers 32*a*, 32*b*, 32*c*, and 32*d*, adapted to be connected in circuit by means of a similar contact 40, the position of which is controlled by pull chains 42 and 43: similarly, snap switches may be substituted for the arrangement shown, or a continuously variable condenser may be utilized.

The arrangement of Figure 6 will provide satisfactory reproduction of signals, from nearby broadcasting stations, particularly when it is not desired to produce a large volume of sound. In case it is desired to effect loud speaker reproduction from distant stations, the arrangements shown in Figures 8 and 9 may be utilized.

Referring now more particularly to Figure 8, I have shown radio receiving apparatus of the conventional type comprising antenna 35 including coil 31 forming the primary of a suitable input transformer leading to a radio frequency amplifier, the output of which is supplied to a detector and the detected currents from which are amplified by a suitable audio amplifier; instead of physically connecting the sound reproducing device to the output of the audio frequency amplifier, the output currents may be supplied to a suitable open or closed circuit 47 which may be in the form of wires leading to any desired point, and to which similar wires included within the pillow may be inductively or capacitively coupled. This permits the movement of the pillow as desired without restriction due to length of connecting leads, and also permits the use of a plurality of speakers operated by the same receiver.

It may be desired to provide one or more stages of audio frequency amplification within the pillow for the purpose of overcoming the losses in the transfer of energy from the output of the audio amplifier to the pick-up system of the pillow: and in this instance, such apparatus may be mounted within the pillow in substantially the manner shown in Figure 6.

Under certain conditions, it may be desired to utilize a plurality of such pillows, each receiving and responding to a different transmitter: in such case, there may be provided a radio frequency amplifying system adapted to receive and radiate signals at radio frequency, either on the same frequencies as received, or on different frequencies. For this purpose, there may be provided a radiating circuit 48 attached to the output of the amplifier: the amplifier itself may comprise a tuned system selectively amplifying at one frequency, or an aperiodic amplifying system amplifying all incoming frequencies: or it may be in the form of a heterodyne which may increase or decrease the frequency of all incoming signals by any desired amount, which new frequencies amplified if desired, may be radiated through the radiating circuit 48. The receiver in such case will preferably comprise a pick-up system with or without radio frequency amplification, a selecting system, a detector, and if desired an audio frequency amplifying apparatus. Such receiver may be utilized also to reproduce signals received from a radio phonograph as shown in Figure 9 which may conveniently comprise a thermionic vacuum tube oscillator 50 having an input circuit comprising coil 51 and a condenser 52 provided if desired, with antenna 53 and counterpoise 54 of relatively small size. The input circuit may be connected between the cathode 55 and the control electrode 56, and an output circuit is connected between anode 57 and extends through a suitable feed back coil 58 and a microphone or magnetic pick-up 59 provided with a stylus adapted to be driven by a suitable record. The plate circuit is completed through a suitable source of potential for feeding space current and heating the current to the oscillator 60. As will be understood, the microphone or magnetic pick-up 59 serves to modulate at audio frequencies the radio frequency oscillations generated by the oscillator 50 which are radiated by the radiating system comprising antenna 53 and counterpoise 54 and the radiated oscillations are picked up by the receiver, detected, amplified if desired, and converted into sound of the desired volume. Such a signal distribution system has been claimed in a divisional application filed October 30, 1930 and issued as Patent No. 1,931,236.

Under certain conditions, it may be desired to mount the entire apparatus comprising radio frequency amplifier, detector, and audio frequency amplifier within the pillow as shown in Figure 10, in which case a suitable loop 65 may be attached to the fabric, or similarly secured to the pillow or an open antenna and counterpoise circuit or ground may be provided in the form of streamers, having metallic conductors provided therein attached to the pillow; in any event, the controls for volume and selectivity will preferably be provided in the form of chains, cords or the like, extending out of the pillow, and either sufficiently inconspicuous as to be unnoticeable, or decorated in a manner to harmonize with the decorative effects thereupon.

While I have shown and described the devices herein as a pillow, it should be understood that my invention is not limited thereto but contemplates the provision of an upholstered envelope of any sort, which may be an article of furniture, such as a chair, and which includes in a recess therein, an acoustic radiating system, and also if desired, means for controlling the volume within any desired range: and also any necessary or desired audio frequency amplifying apparatus, detecting device and a radio or carrier frequency amplifying apparatus, together with the necessary pick-up devices.

While I have shown and described certain preferred embodiments of my invention, it will be apparent that modifications and changes may be made therein, as will be understood by those skilled in the art, without departing from the spirit and scope of my invention.

I claim:

1. Acoustic apparatus comprising a loud speaker adapted to convert electrical oscillations into sound waves corresponding thereto, a protecting framework surrounding said loud speaker and a yielding and flexible covering having minimum acoustic damping characteristics mounted upon said framework.

2. Acoustic apparatus comprising an acoustic device adapted to convert electrical oscillations into sound waves corresponding thereto, and a yielding and flexible covering comprising a layer of evergreen foliage mounted upon said acoustic device.

3. Acoustic apparatus comprising, in combination, a hollow flexible envelope, electrical sound reproducing apparatus positioned within said envelope, and a layer of soft resilient material extending over the sound radiating portion of said reproducer, said material having a multiplicity of air spaces therein and permitting the passage of sound therethrough.

4. Acoustic apparatus comprising, in combination, a hollow flexible envelope, electrical sound reproducing apparatus positioned within said envelope, and a layer of soft, resilient material extending over the sound radiating portion of said reproducer, said material being permeated throughout with air spaces permitting the passage of sound therethrough.

5. Acoustic apparatus comprising a framework, a hollow yielding and resilient envelope of minimum acoustic damping characteristics, comprising a layer of evergreen foliage mounted upon said framework, and sound reproducing apparatus adapted to convert electrical oscillations into sound waves corresponding thereto, mounted upon said framework within said envelope.

6. Acoustic apparatus comprising an acoustic device adapted to convert electrical oscillations into sound waves corresponding thereto, a yielding and resilient covering having minimum acoustic damping characteristics mounted upon said acoustic device, said yielding and resilient covering being arranged to completely cover said acoustic device to permit the ear of the listener to be placed in intimate and comfortable proximity thereto without contact with any hard object, and means for controlling the intensity of sound produced thereby.

7. Acoustic apparatus comprising a framework, a hollow yielding and resilient envelope of minimum acoustic damping characteristics mounted upon said framework, to permit the ear of the listener to be placed in intimate and comfortable proximity to said acoustic device, a loud speaker adapted to convert electrical oscillations into sound waves corresponding thereto, mounted within said framework and means for controlling the intensity of sound produced thereby.

8. Acoustic apparatus comprising an acoustic device adapted to convert electrical oscillations into sound waves, corresponding thereto, a yielding and resilient covering having minimum acoustic damping characteristics mounted upon said acoustic device to permit the ear of the listener to be placed in intimate and comfortable proximity to said acoustic device without contact with any hard object, means for controlling the intensity of sound produced thereby, mounted within said covering, and a flexible operating control for said means extending through said covering.

9. Acoustic apparatus comprising an acoustic device adapted to convert electrical oscillations into sound waves corresponding thereto, a yielding and flexible covering having minimum acoustic damping characteristics, enclosing said acoustic device, and means within said covering for supplying electrical oscillations to said acoustic device without metallic connection to the source of such oscillations.

10. Acoustic apparatus comprising a supporting framework an acoustic device carried by said framework adapted to convert electrical oscillations into sound waves corresponding thereto, a yielding and flexible covering having minimum acoustic damping characteristics mounted upon said acoustic device to permit the ear of the listener to be placed in intimate and comfortable proximity thereto and to be supported thereby, and means within said covering for supplying electrical oscillations to said acoustic device without metllic connection to the source of such oscillations, said means comprising metallic conductors adapted to be coupled with a circuit carrying the electrical oscillations to be supplied to said acoustic device.

11. Acoustic apparatus comprising an acoustic device adapted to convert electrical oscillations into sound waves corresponding thereto, a yielding and flexible covering having minimum acoustic damping characteristics mounted upon said acoustic device, and means associated therewith, for supplying electrical oscillations to said acoustic device, without metallic connection to the source of such oscillations, said means comprising metallic conductors adapted to be coupled with a circuit carrying the electrical oscillations to be supplied to said acoustic device, and means for amplifying the oscillations produced in said conductors all of said apparatus being mounted within said covering.

12. Acoustic apparatus comprising an acoustic device adapted to convert electrical oscillations into sound waves corresponding thereto, a yielding and flexible covering having minimum acoustic damping characteristics mounted on said acoustic device, and means associated therewith for supplying electrical oscillations to said acoustic device without metallic connection to the source of such oscillations, said means comprising metallic conductors adapted to be coupled with a circuit carrying the oscillations to be supplied to said acoustic device, a frequency selecting circuit, and means for amplifying the received oscillations, and flexible means for varying the operating characteristics of desired parts of such apparatus and extending through said covering all of said apparatus being mounted within said covering.

13. Acoustic apparatus comprising an acoustic device adapted to convert electrical oscillations into sound waves corresponding thereto, a resilient and flexible covering having minimum acoustic damping characteristics mounted on said acoustic device and means associated therewith for supplying electrical oscillations to said acoustic device without metallic connection to the source of such oscillations, said means comprising metallic conductors adapted to be coupled with a circuit carrying the oscillations to be supplied to said acoustic device, a frequency selecting circuit, a detector and means for amplifying the received oscillations and flexible means for varying the operating characteristics of desired parts of such apparatus and extending through said covering all of said apparatus being mounted within said covering.

14. Acoustic apparatus comprising in combination, a framework, audio frequency amplifying apparatus mounted thereon, a sound reproducer carried thereby and connected to said amplifying apparatus, and a resilient covering mounted on said framework over said amplifying apparatus and loud speaker to support the ear of the listener in intimate and comfortable proximity to said loud speaker.

15. Acoustic apparatus comprising in combination, a framework, radio receiving apparatus mounted on said framework, a sound reproducer carried thereby and operable by said receiving apparatus and a resilient covering mounted thereon over said receiving apparatus to support the ear of the listener in intimate and comfortable proximity to said loud speaker.

16. Acoustic apparatus comprising in combination, an electrically operable sound reproducer, a resilient and flexible covering extending over the sound radiating portion of said reproducer, and constructed and arranged to support the ear of a listener in intimate and comfortable proximity thereto, said covering comprising a resilient body permitting the passage of sound therethrough.

17. Acoustic apparatus comprising in combination, an electrically operable sound reproducer, a resilient and flexible covering extending over the sound radiating portion of said reproducer and constructed and arranged to conform to and comfortably support the ear of a listener in proximity to said sound reproducer, said covering comprising a layer of resilient material permeated with air spaces.

18. An individual sound reproducing device comprising a telephone receiver, a cushion-like member including cushioning material completely surrounding said receiver on all sides thereof, the sound waves from said telephone receiver being transmitted through the cushioning material of said cushion-like member.

19. An individual sound reproducing device comprising a cushion-like member, a telephone receiver positioned within said member, and a supporting form within said member for holding said telephone receiver in place.

ALEXANDER McLEAN NICOLSON.